US009411838B2

(12) United States Patent
Muras

(10) Patent No.: US 9,411,838 B2
(45) **Date of Patent: *Aug. 9, 2016**

(54) TABLE ORGANIZATION USING ONE OR MORE QUERIES

(71) Applicant: International Business Machines Corporation, Armonk, NY (US)

(72) Inventor: Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/180,660

(22) Filed: Feb. 14, 2014

(65) Prior Publication Data

US 2015/0234874 A1 Aug. 20, 2015

(51) Int. Cl.
*G06F 17/30* (2006.01)

(52) U.S. Cl.
CPC .... *G06F 17/30315* (2013.01); *G06F 17/30324* (2013.01); *G06F 17/30339* (2013.01); *G06F 17/30424* (2013.01); *G06F 17/30463* (2013.01)

(58) Field of Classification Search
CPC .................... G06F 17/30324; G06F 17/30463; G06F 17/30292; G06F 17/30315; G06F 17/3033
USPC .......................... 707/745, 718, 752, 803, 749
See application file for complete search history.

(56) References Cited

U.S. PATENT DOCUMENTS 5,758,145 A 5/1998 Bhargava et al.
5,884,307 A 3/1999 Depledge et al.
6,026,412 A 2/2000 Sockut et al.
6,122,626 A 9/2000 Brandsma
6,546,395 B1 4/2003 DeKimpe et al.
6,629,102 B1 9/2003 Malloy et al.
6,711,563 B1 * 3/2004 Koskas ............. G06F 17/30324 707/600
6,879,976 B1 4/2005 Brookler et al.
7,035,851 B1 4/2006 Sinclair et al.
7,191,174 B2 3/2007 Day et al.
7,774,346 B2 * 8/2010 Hu .................... G06F 17/30324 707/715
8,456,972 B2 6/2013 Mehra et al.
8,566,333 B2 10/2013 Muras
8,762,407 B2 * 6/2014 Wang ................ G06F 17/30592 707/600
8,843,499 B2 * 9/2014 Kirk .................... G06F 17/3033 707/713

(Continued)

FOREIGN PATENT DOCUMENTS

CN 1877576 A 12/2006
CN 101520868 A 9/2009
CN 101702162 A 5/2010

OTHER PUBLICATIONS

Anonymous, "Intelligently Ordering Tables by Key Value Density," An IP.com Prior Art Database Technical Disclosure, Aug. 13, 2013, 7 pages. IP.com No. IPCOM000230017D.

(Continued)

*Primary Examiner* — Dangelino Gortayo
(74) *Attorney, Agent, or Firm* — Scott S. Dobson; Feb R. Cabrasawan

(57) ABSTRACT

A method, system and computer program product are provided for reorganizing a database table according to a set of queries. More specifically, the table is reorganized such that random I/O is reduced by more tightly grouping together rows in the table associated with each of the referencing queries. This enables more associated rows from a given table relevant to a query to be read into memory for a given I/O operation.

8 Claims, 5 Drawing Sheets

(56) References Cited

U.S. PATENT DOCUMENTS

| | | | | |
|---|---|---|---|---|
| 8,856,138 | B1 * | 10/2014 | Neubeck | G06F 17/30985 707/745 |
| 8,943,103 | B2 | 1/2015 | Annapragada | |
| 2004/0236727 | A1 | 11/2004 | Day et al. | |
| 2006/0064416 | A1 | 3/2006 | Sim-Tang | |
| 2010/0036799 | A1 | 2/2010 | Bouloy et al. | |
| 2015/0234878 | A1 | 8/2015 | Muras | |

OTHER PUBLICATIONS

IBM, "Reorganizing user specified table relations to correct for unplanned user queries or model defects," An IP.com Prior Art Database Technical Disclosure, Jul. 14, 2009, 3 pages. IP.com No. IPCOM000185178D.

Im et al., "Optimization of Space Matrix Kernels for Data Mining", Computer Science Division, University of California, Berkley, Abstract Number: 193, 17 pages.

* cited by examiner

400

405 410 415

| Column_X | DCBA => Sort Weight |
|---|---|
| 1 | 0100 => 4 |
| 2 | 0010 => 2 |
| 3 | 0100 => 4 |
| 4 | 1010 => 10 |
| 5 | 0001 => 1 |
| 6 | 0010 => 2 |
| 7 | 1000 => 8 |
| 8 | 0001 => 1 |
| 9 | 1000 => 8 |
| 10 | 0101 => 5 |

420

| Column_X | Column_Y |
|---|---|
| 5 | Other data... |
| 8 | |
| 2 | |
| 6 | |
| 1 | |
| 3 | |
| 10 | |
| 7 | |
| 9 | |
| 4 | |

FIG. 4

TABLE ORGANIZATION USING ONE OR MORE QUERIES

BACKGROUND

This disclosure relates generally to databases of computer systems and, more particularly, relates to reorganizing a table according to one or more queries. Databases use tables to organize information. Each table consists of a number of rows, each of which corresponds to a single database record. Keys are used to organize the database. Each database table has one or more columns designated as the primary key. The value of this key is unique for each record in the database. Database tables are traditionally organized physically on a storage medium (such as a hard disk).

BRIEF SUMMARY

The disclosure and claims herein are directed to a method, system and computer program product for reorganizing a table according to one or more queries. The reorganized table may have a positive impact on I/O performance attributes relative to the original table. More specifically, the table is reorganized such that random I/O may be reduced by more tightly grouping together rows in the table associated with each of the referencing queries.

In embodiments, a method for reorganizing a database table residing on a computer system according to at least one query of a set of queries is provided. The method begins by constructing a bitmap for each row entry (i.e., a specific row in a table) within the database table, the bitmap having n bit positions. Each of the n bit positions corresponds to the referencing state of one of the set of queries. The method then sorts the row entries within the database table based upon the value of the bitmap.

In embodiments, the step of constructing a bitmap further comprises the steps of: 1) initializing the bitmap to “0”; 2) for each row within the database table, determining if any of the set of queries point to the row; and 3) if any of the set of queries point to the row, setting the bit positions within the bitmap corresponding to the reference queries associated with the row to “1”). In embodiments, the bit positions within the bitmap are organized such that the most significant bit positions within the bitmap are assigned to the most popular queries within the set of queries, and the least significant bit positions within the bitmap are assigned to the least popular queries. In embodiments, the popularity of each of the queries is determined by monitoring query use by at least one counter. In another embodiment, the popularity of each of the queries is determined by computing and saving the average job priority of queries, wherein the highest average job priority queries are the most popular queries, and the lowest average job priority queries are the least popular queries. In embodiments, the bit positions within the bitmap are organized such that the most significant bit positions within the bitmap are assigned to the queries which select the most rows within the set of queries, and the least significant bit positions within the bitmap are assigned to the queries which select the fewest rows.

In embodiments, the set of queries reference the same column within the database table, while in an alternative embodiment the set of queries references a set of columns within the database table. In embodiments, one or more of the set of queries are ignored in computing the value of the bitmap, based upon a set of predefined criteria. As an example, one of the set of predefined criteria is the number of rows selected by the query.

In embodiments, the present disclosure also provides a program product having a recordable computer readable storage medium. Program code is stored on the computer readable storage medium and is configured upon execution to reorganize a database table residing on a computer system according to a set of queries, including the steps of: constructing a bitmap for each row entry within the database table, the bitmap having n bit positions, each of the n bit positions corresponding to the referencing state of one of the set of queries; and sorting the row entries within the database table based upon the value of the bitmap.

In embodiments, the present disclosure also provides a system, the system including one of more computer processors, and a memory containing a program, which when executed to the one or more processors is configured to perform an operation. The operation includes: constructing a bitmap for each row entry within the database table, the bitmap having n bit positions, each of the n bit positions corresponding to a referencing state of one of the set of queries; and sorting the row entries within the database table based upon the value of the bitmap.

The foregoing and other features and advantages will be apparent from the following more particular description, as illustrated in the accompanying drawings.

BRIEF DESCRIPTION OF THE DRAWINGS

So that the manner in which the above recited features, advantages and objects of the present disclosure are attained and can be understood in detail, a more particular description of the invention, briefly summarized above, may be had by reference to the embodiments thereof which are illustrated in the appended drawings.

It is to be noted, however, that the appended drawings illustrate only typical embodiments of this disclosure and are therefore not to be considered limiting of its scope, for the invention may admit to other equally effective embodiments.

FIG. 4 illustrates a first table, wherein a bitmap is created for each row based upon which of the queries reference the given row; and a second table created upon sorting the rows of the first table based on the numerical value of the bitmap associated with each row.

DETAILED DESCRIPTION

A method, system and computer program product are provided for reorganizing a database table according to one or more queries. The reorganized table may have a positive impact on I/O performance attributes relative to the original table. More specifically, the table is reorganized such that random I/O may be reduced by more tightly grouping together rows in the table associated with each of the referencing queries. This enables more associated rows from a table relevant to a specific query to be read into memory for a given I/O operation.

Besides applications, queries come from many places including: Materialized Query Tables (MQTs), VIEWs, Stored Procedures, User Defined Functions, etc. A few of these queries may be the most popular or important and the table should be optimized and organized for these queries. A database monitor or user administrator can identify these important queries. Currently, there is not a practical way to physically reorganize a table according to one or more queries (reorganizing via one or more queries is distinct from reorganizing via an index for reasons including that, for example, a large number of queries may hit the table rather than a relatively small number of indexes). Thus, without physically reorganizing the table, performance may be suboptimal due to high randomness of the I/O operations.

For instance, if a particular query selects n rows, the n rows may be spread over up to n blocks of data on disk causing up to n I/Os when they are read into memory. Aspects of the disclosure may block rows together on disk causing fewer than n I/Os and perhaps as little as one I/O to read all n rows. Typically, the table may be organized according to one or more queries. In addition, the table can be organized according to one or more indexes. For example, in cases where the weight is the same for two rows, they can be ordered according to the key values(s) of some index.

Figure 1:
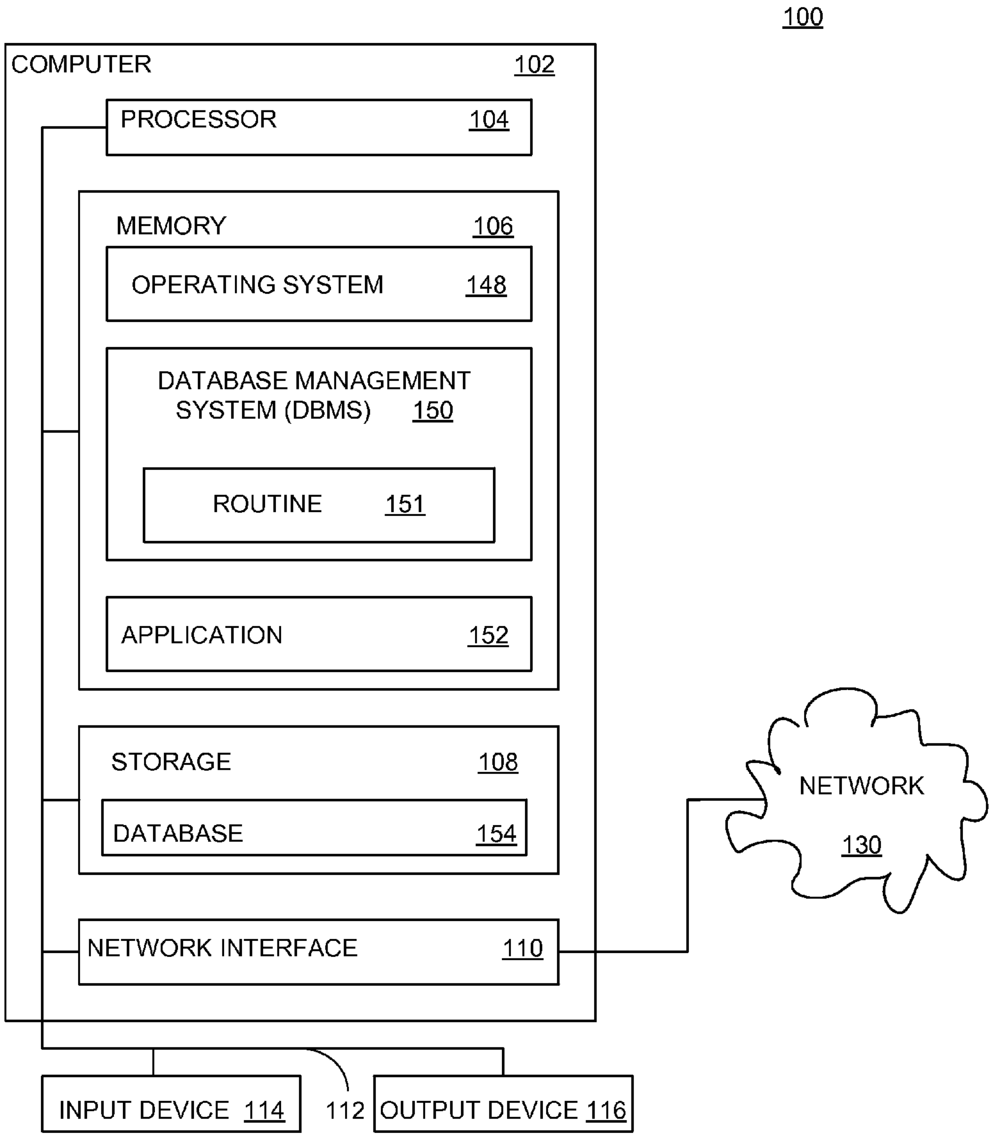
FIG. 1 is a block diagram illustrating a system for reorganizing a database table according to one or more queries, according to embodiments of the present disclosure.

FIG. 1 is a block diagram illustrating a networked system 100 for reorganizing a database table according to a set of queries (one or more queries), according to embodiments of the present disclosure. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 148. An operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger memory capacity DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes the operating system 148, a Database Management System (DBMS) 150, and an application 152. The DBMS 150 may manage a database 154, shown in storage 108. Generally, those skilled in the art will recognize that the present invention has application to any DBMS software that uses Structured Query Language (SQL), and may similarly be applied to database software using non-SQL queries. More generally, however, it should be understood that the data to be accessed need not be part of a DBMS at all. The application 152 (and more generally, any requesting entity, including the operating system 148) is configured to issue queries against the database 154. Although only one database is shown for simplicity, the DBMS 150 may manage multiple databases. Further, the databases may be distributed relative to one another, e.g., over the network 130. And although the application 152 and the DBMS 150 are shown to be executing on the computer 102, the application 152 may also execute on a different computer that communicates with the computer 102 via the network 130.

In embodiments, the database 154 is representative of any collection of data, regardless of the particular physical representation of the data. A physical representation of data defines an organizational schema of the data. By way of illustration, the database 154 may be organized according to a relational schema (accessible by SQL queries) or according to an XML schema (accessible by XML queries). However, embodiments of the invention are not limited to a particular schema and contemplate extension to schemas presently unknown. As used herein, the term “schema” generically refers to a particular arrangement of data.

In embodiments, the database 154 stores database tables that include data pages. Each data page is configured to store data rows that, in turn, store information. The database may also include a database index for logically ordering the data rows. The database index includes index pages. Each index page is configured to store index entries, where each data row is referenced by a corresponding index entry. The data pages and the index pages are arranged to be stored on and retrieved from a storage medium such as the storage 108.

In embodiments, the application 152 issues a request to the DBMS 150. The request includes a query statement (e.g., a select, insert, or update). Depending on the embodiment, the request issued by the application 152 may be predefined (i.e., hard coded as part of the application 152) or may be generated in response to input (e.g., user input).

In embodiments, to service the request from the application 152, the DBMS 150 performs a number of database operations. For example, the DBMS 150 retrieves queries and data rows from storage (e.g., disk or tape) into a database cache (e.g., in main memory). The speed of accessing the storage 108 may be much slower than other operations involved in servicing a request, such as operations involving the database cache. Consequently, performance of the DBMS 150 in servicing the request may be, to a large extent, determined by a frequency with which the DBMS 150 accesses the storage 108.

In embodiments, the DBMS 150 includes one or more routines 151 to reorganize one or more tables within the database such that random I/O is minimized by more tightly grouping together rows in the table associated with each of the referencing queries. This enables more associated rows from a table relevant to a specific query to be read into memory for a given I/O operation. Accordingly, the performance of the DBMS 150 in servicing requests may be improved. In embodiments, a DBMS engine may be used to run various queries internally and set bitmaps per row based on output.

In embodiments, the reorganization (i.e. sort) of the tables within the database is manually initiated by a system administrator. Typically, such an activity would be scheduled to occur at a time when overall system activity is slow such as over a weekend. In another embodiment, the reorganization may be performed periodically (weekly, monthly, etc) or as needed, as determined by a degree of adjacency metric. For example, a DBMS may have an application which measures the degree of adjacency for rows referenced by each query. If, for example, the measurement application is run periodically and shows the rows are not very adjacent (i.e., fragmented) for each query (i.e., the degree of adjacency metric exceeds a predefined threshold value), the measurement application may recommend to the system administrator to perform a reorganization, or alternatively, automatically reorganize the table via a reorganization application.

Figure 2:
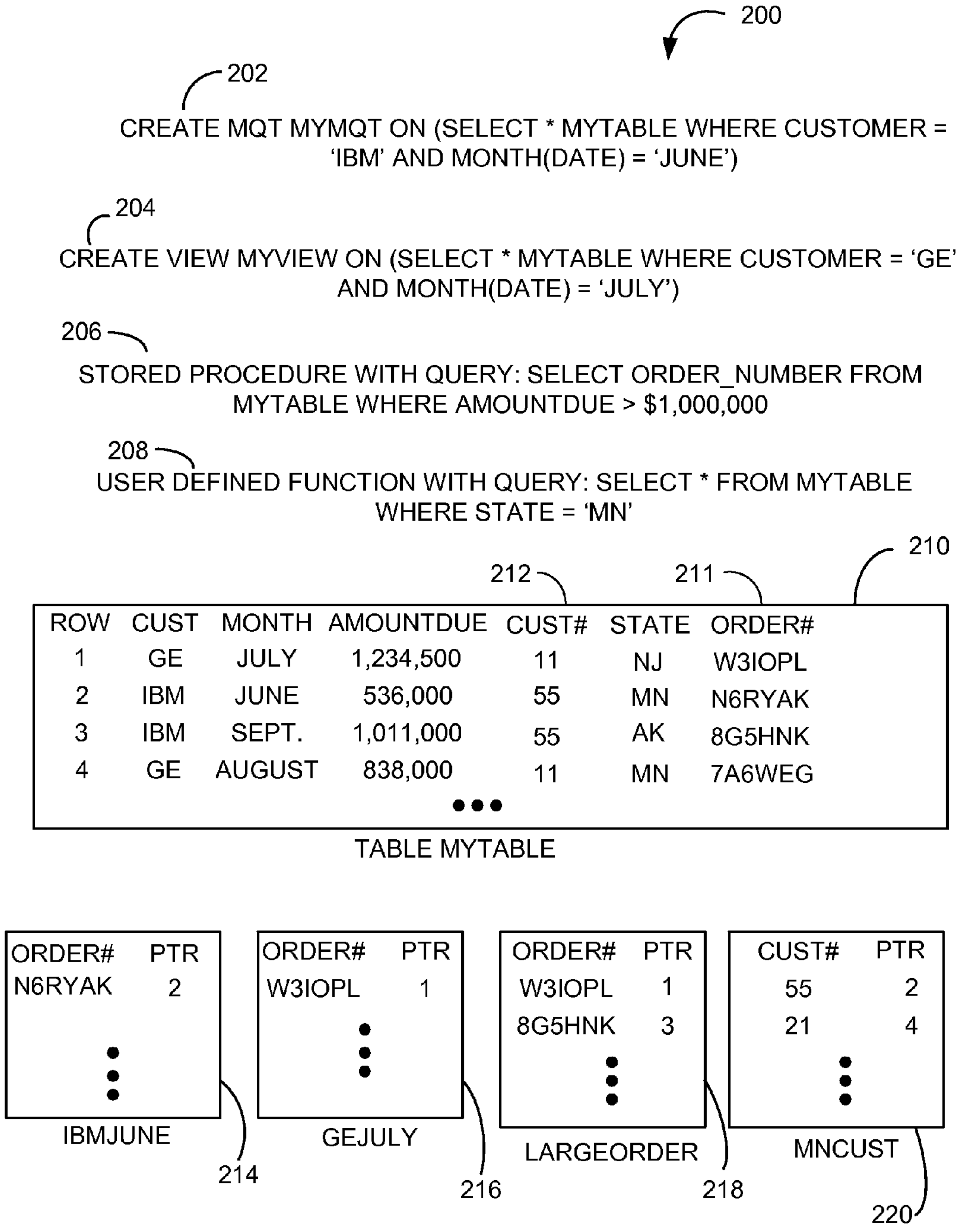
FIG. 2 illustrates a set of example query statements from various sources.

FIG. 2 illustrates a set of example query statements from various sources, shown generally at 200. In the illustrated embodiment, four query statements 202, 204, 206 and 208 are used to create a set of query results 214, 216, 218 and 220 using SQL selection predicates on a table 210.

In the first example query statement 202, a query result entitled "IBMJUNE" 214 is created from table "MYTABLE" 210 over column "ORDER#" 211 where field "CUST" in the table contains the value "IBM", and the field "MONTH" in the table contains the value "June". As can be seen, row 2 of table "MYTABLE" 210 satisfies the search criteria, and the ROW value "2" and the "ORDER#" value "N6RYAK" are written to the "IBMJUNE" query result 214. The "ROW" value 2 in the second column of the query result 214 serves as a pointer back into the table 210.

In the second example query statement 204, a query result entitled "GEJULY" 216 is created from table "MYTABLE" 210 over column "ORDER#" 211, where field "CUST" in the table contains the value "GE", and the field "MONTH" in the table contains the value "July". In this instance, row 1 of the table "MYTABLE" 210 satisfies the search criteria, and the "ROW" value "1" and the "ORDER#" value "W3IOPL" are written to the "GEJULY" query result 216. The "ROW" value 1 in the second column of the query result 216 serves as a pointer back into the table 210.

In the third example query statement 206, a query result entitled "LARGEORDER" 218 is created from table "MYTABLE" 210 over column "ORDER#" 211, wherein any entry in table "MYTABLE" 210 where field "AMOUNT-DUE" exceeds $1,000,000 will be selected for inclusion in query result "LARGEORDER" 218. In this instance, rows 1 and 3 of the table "MYTABLE" 210 satisfy the search criterion, and the ROW values "1" and "3" and the "ORDER#" values "W3IOPL" and "8G5HNK", respectively, are written to the "LARGEORDER" query result 218. The "ROW" values 1 and 3 in the second column of the query result 218 serve as pointers back into the table 210.

In the fourth example query statement 208, a query result entitled "MNCUST" 220 is created from table "MYTABLE" 210 over column "CUST#" 212, wherein any entry in "MYTABLE" 210 that contains the value "MN" in the "STATE" field will be selected for inclusion in the query result "MNCUST" 220. In this instance, rows 2 and 4 of the table "MYTABLE" 212 satisfy the search criterion, and the ROW values "2" and "4" and the "CUST#" values "11" and "55", respectively, are written to the "MNCUST" query result 220. The "ROW" values 2 and 4 in the second column of the query result 220 serve as pointers back into the table 210. Queries of varying types and specificity other than those listed are contemplated.

Figure 3:
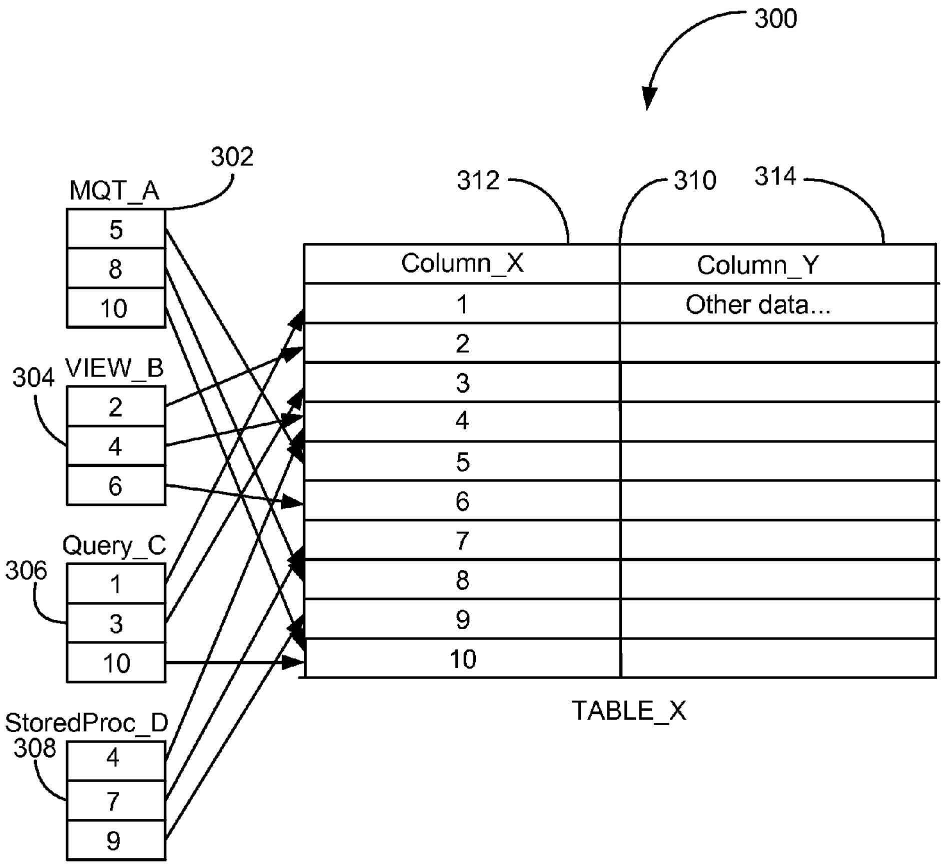
FIG. 3 illustrates a set of queries pointing to a referenced table, where no query has rows in the referenced table that are adjacent to each other.

FIG. 3 illustrates a set of queries 302, 304, 306 and 308 pointing to a referenced table 310, where no query points to rows in the referenced table that are adjacent to each other, shown generally at 300. In the illustrated example, the rows within COLUMN_X 312 of the table are in order. Despite this fact, no query 302, 304, 306 or 308 has rows which are adjacent to each other. For example, query MQT_A 302 references rows 5, 8 and 10 within table 310. Query VIEW_B 304 references rows 2, 4 and 6 within table 310. Query Query_C 306 references rows 1, 3 and 10 within the table 310. Finally, query StoredProc_D 308 references rows 4, 7 and 9 within the table 310. As a result, in response to the set of queries, the non-adjacency of the referenced rows within table 310 will tend to cause I/O operations to be random rather than blocked, thus producing suboptimal performance.

FIG. 4 illustrates a first table 410, in accordance with the present disclosure, wherein a bitmap 415 is created for each row entry within the table based upon which of the queries reference the given row; and a second table 420 created upon sorting the rows of the first table in ascending order based on the numerical value of the bitmap associated with each row, shown generally at 400. First table 410 is essentially table 310 from FIG. 3, with the addition of a new column 415 containing bitmap information associated with each row of the table.

As illustrated earlier in FIG. 3, each row within the table may be associated with at least one query within the table 310. In FIG. 4, in column 415, a bitmap entry is created for each row, wherein the i-bit position within the bitmap entry represents the i-th query. Thus if a given row is referenced by a query, a "1" appears in the bit associated with that query in the bitmap entry, otherwise the bit entry contains a "0" (default) value assigned at initialization.

After the entire bitmap entry is constructed, a decimal representation is then computed for each bitmap entry. This decimal representation becomes the sort weight for each row within the table. Thus, a bitmap value of "0100" would be assigned a decimal value of "4", and a bitmap value of "1010" would be assigned a decimal value of "10". This value is used to re-sort the rows of the table. Second table 420 illustrates first table 410, after the table has been re-sorted. Note that the table has been re-sorted in ascending order, based on the decimal value of the bitmap in the first table 410, column 415.

By way of example, the first row of the first table 410 is pointed to by query "Query_C" 306 (see FIG. 3). As a result, the bitmap 315 associated with the first row is "0100" (the columns in the bitmap being arranged in DCBA order), having a decimal sort weight value of "4". Row 4 of table 410 is pointed to by two queries (VIEW_B 304 and StoredProc_D 308 as shown in FIG. 3). As a result, the "B" and "D" values within the bitmap are assigned a "1" value associated with the reference query. Since the bitmap is arranged in DCBA order, the resultant bitmap value associated with the row is "1010", or decimal value "10".

Note that if a row is not selected by any query, it would have a sort weight of zero and be blocked with other rows that are not selected by any query. Within a particular sort weight, rows can, by way of example, be sorted by the actual value in the column.

Within the examples provided, all queries point to the same column within the database table. In other embodiments of the present disclosure, the queries may point to a different column, or set of columns within the database table, and still remain within the scope and spirit of the present disclosure.

In embodiments, when determining sort order for the database table, the leftmost position in the bitmap is associated with the most popular query, the second leftmost position in the bitmap is associated with the second most popular query, etc. In this way, the most popular queries will be grouped more tightly together, and, in fact, the leftmost bit position is guaranteed to have all of its rows together.

There are several alternatives available to determine the most popular queries. For example, the most popular query can be determined by monitoring which queries are used, then keeping counters for each query to determine the popularity. In another example, the priority of jobs in which database queries run is monitored and recorded, such that queries used most often in high priority jobs are associated with the leftmost bitmap positions, while queries most used with lower priority jobs are associated with the rightmost bitmap positions. In this way, the highest average job priority queries are the most popular queries, and the lowest average job priority queries are the least popular queries. In embodiments, the bit positions within the bitmap are organized such that the most significant bit positions within the bitmap are assigned to the queries which select the most rows within the set of queries, and the least significant bit positions within the bitmap are assigned to the queries which select the fewest rows.

In embodiments of the present invention, certain queries may not be considered (i.e., ignored) when determining the sort weight. As an example, if a certain query selects too may rows within a table, it may be ignored, since it implicitly causes rows to be blocked. Similarly, if a certain query selects too few rows, it may also be ignored since it would not need to use blocking. Additionally, a query may not be used frequently enough to be considered.

Figure 5:
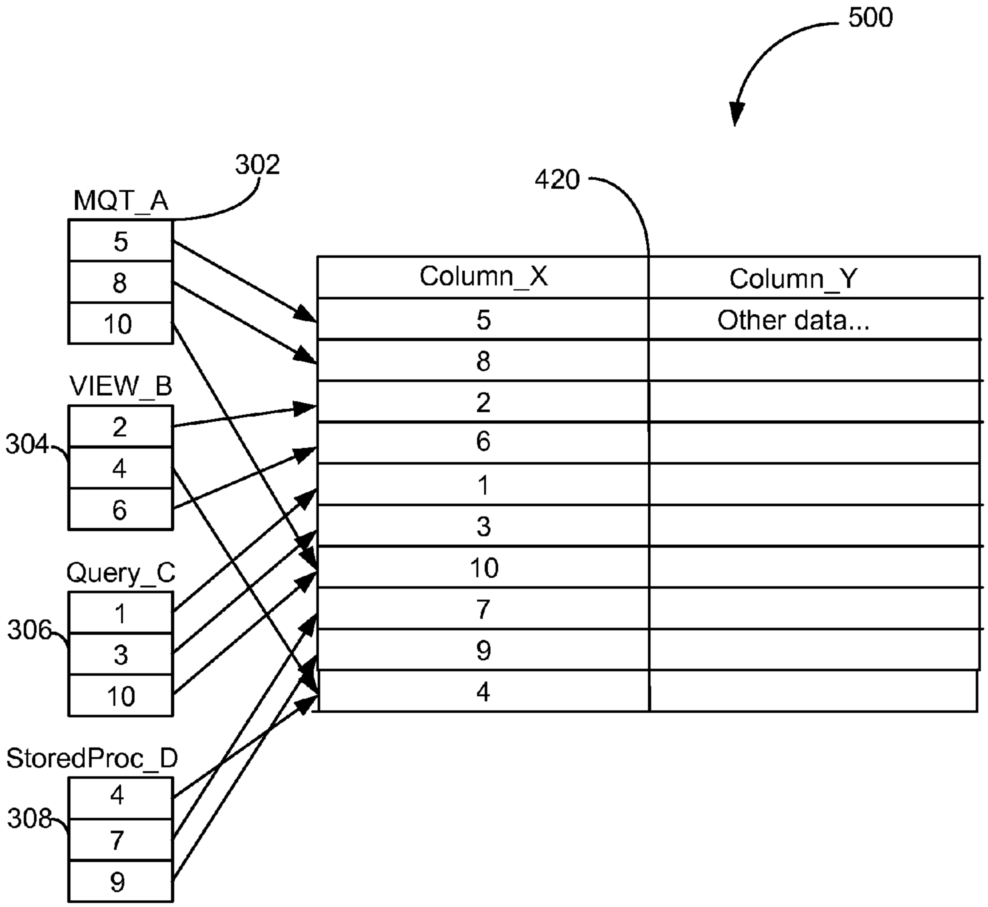
FIG. 5 illustrates the set of queries of FIG. 3, pointing to the updated second table of FIG. 4, wherein most of the rows in the table are now adjacent to other rows in each of the queries.

FIG. 5 illustrates the set of queries of FIG. 3, pointing to the updated, sorted second table 420 of FIG. 4, wherein most of the rows in the table are now adjacent to other rows in each of the queries. In this illustrative example, the first two queries 302 and 304 now have ⅔ of their rows adjacent in the sorted table 420, and the last two queries 306 and 308 have all of their rows adjacent to each other. Thus, random I/O is reduced and blocking of rows into memory is positively impacted, resulting in faster overall access performance when using the queries.

In embodiments, the table may be primarily organized according to one or more queries. In such embodiments, the table can be secondarily organized according to one or more indexes. For example, in cases where the weight is the same for two rows, they can be ordered according to the key values(s) of some index. In embodiments, join queries may set bits in bitmaps of a plurality of tables for the reorganization of multiple tables.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for reorganizing a database table residing on a computer system according to a set of queries, comprising:

constructing a bitmap for each row entry within the database table, the bitmap having n bit positions, each of the n bit positions corresponding to a referencing state of one of the set of queries, wherein constructing the bitmap comprises:

initializing the bitmap to “0”;

for each row within the database table, determining if any of the set of queries point to the row; and if yes, setting the bit positions within the bitmap corresponding to the referencing queries associated with the row to “1”;

computing a value for the bitmap as a function of individual bit values for the n bit positions; and sorting the row entries within the database table based upon the value of the bitmap, wherein the bit positions within the bitmap are organized such that the most significant bit positions within the bitmap are assigned to the most popular queries within the set of queries, and the least significant bit positions within the bitmap are assigned to the least popular queries, and wherein the popularity of each of the queries is determined by computing and saving the average job priority of queries associated with the query, wherein the highest average job priority queries are the most popular queries, and the lowest average job priority queries are the least popular queries.

2. The computer-implemented method of claim 1, wherein the set of queries reference the same column within the database table.

3. The computer-implemented method of claim 1, wherein in the set of queries reference a set of columns within the database table.

4. The computer-implemented method of claim 1, wherein one or more of the set of queries are ignored in computing the value of the bitmap, based upon a set of predefined criteria.

5. The computer-implemented method of claim 4, wherein one of the set of predefined criteria is the number of rows selected by the query.

6. The computer-implemented method of claim 1, further comprising sorting, in response to sorting the row entries within the database table based upon the value of the bitmap, at least a portion of the row entries within the database table based upon an index.

7. The computer-implemented method of claim 1, further comprising setting a plurality of bits in a plurality of bitmaps associated with a plurality of tables to reorganize the plurality of tables.

8. The computer-implemented method of claim 1, wherein sorting the row entries within the database table based upon the value of the bitmap further comprises the steps of:

determining a degree of adjacency metric for rows in the database table referenced by each of the set of queries; and if the value of the degree of adjacency metric exceeds a predefined threshold value, sorting the row entries within the database.

* * * * *